Nov. 24, 1931.  A. WOLPERT ET AL  1,833,807
THERMOSTAT
Filed Sept. 3, 1929
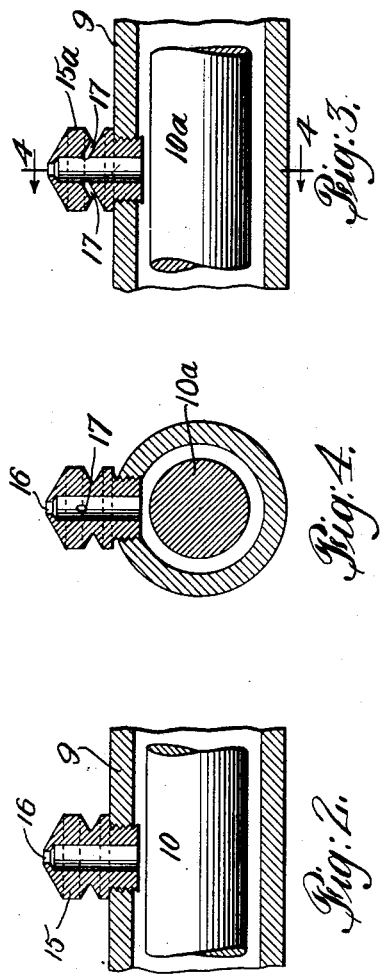
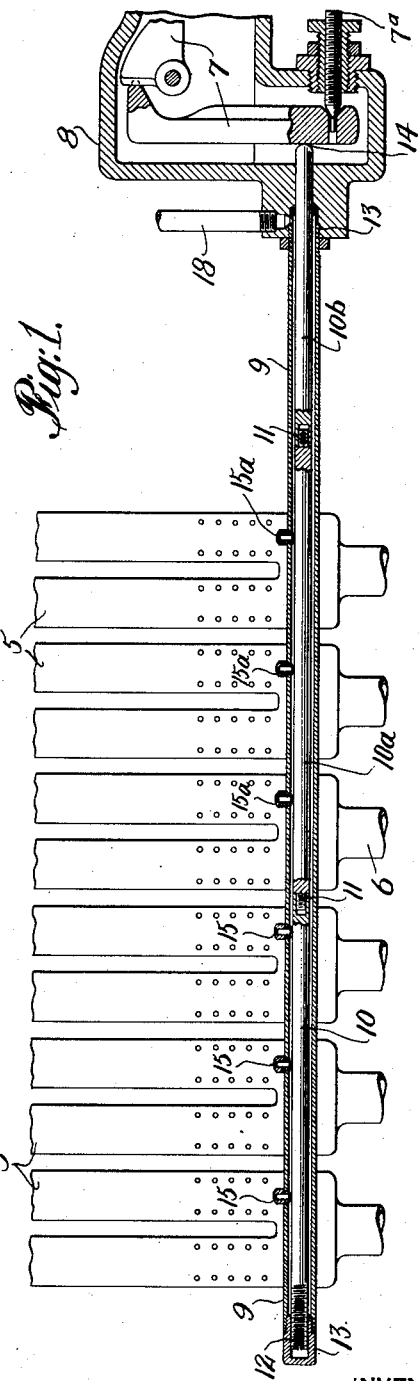
INVENTORS
Albert Wolpert
Edward Lipp
BY
Synnestvedt & Lechner
ATTORNEYS Patented Nov. 24, 1931

1,833,807

UNITED STATES PATENT OFFICE

ALBERT WOLPERT AND EDWARD LAPP, OF PITTSBURGH, PENNSYLVANIA

THERMOSTAT

Application filed September 3, 1929. Serial No. 390,090.

The present invention relates to an improved type of thermostat which has been developed for and is particularly useful in connection with safety pilot lights for automatic gas heating equipment. However, it is not necessarily limited to this particular field, although we have so illustrated it in the accompanying disclosure which represents a preferred embodiment.

Before proceeding with a recitation of the objects of the invention, it will be desirable to explain that thermostats, particularly of the character mentioned, are exposed to great extremes of temperature, although they are frequently called upon to operate either to close or to open the valve which they control upon a difference in temperature which may be no more than from 25 to 50 degrees.

For example, the device or appliance to which the thermostat is attached may be in transit and subject to a temperature as low as, say, zero degrees Fahrenheit, whereas when in operation the thermostat is often subjected to a temperature as high as 450 degrees Fahrenheit. This constitutes a range of 482 degrees, and yet, as stated, the valve may have to operate on a difference of from 25 to 50 degrees in temperature.

Such extreme differences in temperature as above mentioned must be taken into consideration in designing the device, and one of the principal objects of our invention is to provide a simple means for compensating for such extreme differences in temperature, while, at the same time, making possible prompt operation of the thermostat upon the comparatively slight difference in temperature which generally exists where the device is to operate. In this connection our improvements provide a positive means for preventing injury or strain to the mechanism which might otherwise occur under the extreme temperature conditions above mentioned.

A further object of the invention is to provide a thermostat which will operate within a reasonably short time, either to open the valve or to close the valve, in which connection it should be noted that the American Gas Association rulings require that a pilot control for a gas appliance must not require more than ten minutes time to open, nor more than ten minutes time to close. By means of our improvements we are enabled to come well within these limitations—in fact, we have developed an improved device which will open the valve in five minutes time and close it in five minutes time.

A further object of our invention is to compensate for such differences in temperature for the purposes specified with a construction which is simple and inexpensive to manufacture, as well as one which can be easily repaired in case of trouble.

In the drawings:

Fig. 1 is a vertical longitudinal section through our improved thermostat illustrating its application to a gas fired boiler.

Fig. 2 is a section similar to that of Fig. 1 but on an enlarged scale and illustrating only a portion of the thermostat in order to disclose certain of the details.

Fig. 3 is another enlarged section similar to Fig. 2, but illustrating a different portion of the thermostat for the sake of disclosing certain other details, and Fig. 4 is a section on the line 4—4 of Fig. 3.

In Fig. 1 we have illustrated a plurality of burners 5 which, of course, may be of any desired construction, and which, in the present instance, are gas burners for use in a gas fired boiler. Gas is supplied to these burners at the base through the conduits 6 which can be fed from a suitable manifold in any desired manner not illustrated in the present disclosure, because it forms no part of the present invention. The valve which controls the supply of gas to the burners 5 is not illustrated also because it forms no part of the present invention and further because it can be of any one of a number of well known types of automatically controlled valves. Suffice it to say that this valve is opened and closed by means of the leverage mechanism 7 within the casing 8, the thermostat of our invention being designed to operate upon the leverage 7.

In the embodiment illustrated the thermostat comprises the outer expansible member or tube 9 and the inner or actuating member 10—10a—10b, the sections 10, 10a and 10b being suitably connected together in any desired manner, as by the threaded joints 11.

In the instant construction the section 10 may be of brass, the section 10a of invar or other inexpansible material, and the section 10b of steel. Inasmuch as the tube 9 is also of steel, the section 10b and the section 9 will have substantially the same coefficient of expansion, but the brass section 10 will have a higher coefficient of expansion than the steel tube 9, and the section 10a of invar, as is well known, will not expand or contract at all.

The outer end of the actuating member is secured in any desired manner, as by means of the threads 12 and the threaded cap 13, to the outer end of the tube 9. The inner end of the tube 9 is securely fastened to the casing 8, as at the point 13, and the inner rod or actuating member projects through the casing to come into contact with the lever 7 at the point 14. The relative positions of the lever 7 can be adjusted by means of the set screw 7a.

It will, therefore, be seen that as the thermostat becomes hot, the outer tube 9 will expand and pull the inner rod away from the lever 7 so as to permit motion of the leverage mechanism to the left, but as the outer rod 9 contracts, it will force the rod to the right in order to move the leverage mechanism to the right. When expanded the valve which controls the supply of gas to the burners 5 will be open, but when contracted, such valve will be closed.

The tube 9 is provided with a plurality of gas pilot lights 15 and 15a, preferably one for each burner 5, as shown. These pilot lights 15 and 15a are substantially the same, with the exception that the pilot lights 15a are provided not only with the vertical outlet 16, but also with outwardly and downwardly projecting side outlets 17. It will further be noted that the pilot jets 15a are located in a portion of the tube 9 which is directly opposite to the inexpansible invar section 10a of the inner rod or actuating member.

Gas is supplied to the tube 9 through the conduit 18 and when the device is to be placed in operation, the gas is turned on through the pipe 18, and all of the pilot jets 15 and 15a are ignited. The flames from the orifices 16 will, of course, project directly upward and will serve to ignite each one of the burners 5, but the flame from the orifices 17 will project downwardly against the tube 9 and rapidly heat the same at the portion which is opposite the inexpansible invar section of the rod. As a consequence, there will be a rapid expansion of the tube 9 while the inner rod will remain substantially the same length. This will give a pronounced and quick effect upon the leverage mechanism 7 and serve to open the gas valve within the requisite time.

As the device continues in operation, the tube 9 will gradually become hot throughout its entire length, and if no provision were made for taking care of the greatly increased expansion thereby resulting, the valve mechanism and the associated leverage mechanism 7 might be severely damaged. However, as the tube 9 becomes hot throughout its entire length, it imparts heat to the brass section 10 of the inner rod, as well as to the steel section 10b, and, inasmuch as the brass section has a higher coefficient of expansion than the tube 9, it will immediately begin to compensate for the added expansion. Indeed, it will more than compensate, so that, on the return motion, quick action in closing the valve through the leverage mechanism 7 will take place. The composite rod 10—10a—10b, therefore, serves not only to prevent damage to the mechanism, but also to insure prompt closing of the valve which the thermostat controls, for it is necessary for the rod to cool to a comparatively slight extent only to cause the required motion of the leverage 7 to take place.

We wish to call attention to the fact that the actuating rod need not necessarily be constructed of the three kinds of metal illustrated, although, for the sake of economy, we prefer to build it as shown. It would be possible to make the rod of two sections, one expansible and the other non-expansible.

For example, a combination of brass and invar would be entirely satisfactory, but invar is a comparatively expensive metal and brass costs more than steel, so that by using only a sufficient length of invar and of brass to secure the desired results, it is possible to construct the balance of the rod of steel as shown, and thereby reduce the cost of manufacture.

We claim:—

1. A thermostat comprising, in combination, an expansible member and an actuating member, said actuating member having an inexpansible section and an expansible section, together with means for first heating a portion of the expansible member which is adjacent the inexpansible section of the actuating member and thereafter heating the balance of the expansible member and the expansible section of the actuating member.

2. A thermostat comprising, in combination, an expansible member and an actuating member, said actuating member having an inexpansible section, a section having a greater coefficient of expansion than the said expansible member, and a section having a coefficient of expansion substantially the same as that of the said expansible member.

3. A thermostat comprising, in combination, a tube, a rod in the tube having an expansible and an inexpansible section, and a pilot jet having an outlet adapted to project a flame in a direction to heat said tube, said jet being located on the tube at a point opposite said inexpansible section.

4. A thermostat rod for a safety pilot, said rod being composed of three sections one of which is inexpansible, one of which expands at a rate greater than that of the body of the safety pilot, and one of which expands at substantially the same rate as the body of the pilot.

5. A thermostat comprising a tube and a rod therein, one of said elements being in sections of relatively different co-efficients of expansion each to each, together with means for altering the temperature of one portion of one of said elements more rapidly than the temperature of another portion thereof.

6. A thermostatic valve controlling mechanism comprising in combination, an expansible member, an adjacent actuating member cooperating therewith, said actuating member having zones of materials of different co-efficients of expansion, means for first heating a portion of said expansible member which is adjacent a zone having a lesser co-efficient of expansion and thereafter heating other portions thereof, and valve operating means actuated by said actuating member.

7. A thermostat comprising in combination a pair of unequally expansible members one of which has an inexpansible section, a section having a greater co-efficient of expansion than the other member and a section having a co-efficient of expansion substantially the same as that of said other member.

8. A thermostatic valve controlling mechanism comprising in combination, an expansible tube, an actuating member having zones of materials of different co-efficients of expansion, valve operating means actuated by said actuating member, means for supplying gas to said tube, a gas jet on the tube opposite a zone having a lesser co-efficient of expansion, a second gas jet on the tube opposite a zone having a greater co-efficient of expansion, and means on said first jet for heating the tube opposite the zone having the lesser co-efficient of expansion before the balance of the tube is heated.

In testimony whereof we have hereunto signed our names.

ALBERT WOLPERT.
EDWARD LAPP.